United States Patent
Fu et al.

(10) Patent No.: US 11,651,526 B2
(45) Date of Patent: May 16, 2023

(54) FRONTAL FACE SYNTHESIS FROM LOW-RESOLUTION IMAGES

(71) Applicant: Northeastern University, Boston, MA (US)

(72) Inventors: Yun Fu, Brookline, MA (US); Yu Yin, Jamaica Plain, MA (US)

(73) Assignee: Northeastern University, Boston, MA (US)

( * ) Notice: Subject to any disclaimer, the term of this patent is extended or adjusted under 35 U.S.C. 154(b) by 311 days.

(21) Appl. No.: 17/156,204

(22) Filed: Jan. 22, 2021

(65) Prior Publication Data
US 2021/0232803 A1 Jul. 29, 2021

Related U.S. Application Data

(60) Provisional application No. 62/965,164, filed on Jan. 23, 2020.

(51) Int. Cl.
| | |
|---|---|
| *G06T 11/00* | (2006.01) |
| *G06N 3/08* | (2023.01) |
| *G06V 40/16* | (2022.01) |
| *G06N 3/045* | (2023.01) |

(Continued)

(52) U.S. Cl.
CPC .............. *G06T 11/00* (2013.01); *G06N 3/045* (2023.01); *G06N 3/08* (2013.01); *G06V 10/764* (2022.01); *G06V 10/82* (2022.01); *G06V 40/161* (2022.01); *G06V 40/168* (2022.01)

(58) Field of Classification Search
CPC .......... G06N 3/045; G06N 3/08; G06N 3/047; G06N 3/084; G06V 10/82; G06V 40/161; G06V 40/168
See application file for complete search history.

(56) References Cited

U.S. PATENT DOCUMENTS

2017/0169286 A9* 6/2017 Gokturk .............. G06F 18/2113

OTHER PUBLICATIONS

Huang, R., et al., "Beyond Face Rotation: Global and Local Perception GAN for Photorealistic Identity Preserving Frontal View Synthesis," IEEE International Conference on Computer Vision (ICCV), pp. 2439-2448 (2017).

(Continued)

*Primary Examiner* — King Y Poon
*Assistant Examiner* — Michael L Burleson
(74) *Attorney, Agent, or Firm* — Hamilton, Brook, Smith & Reynolds, P.C.

(57) ABSTRACT

An apparatus and corresponding method for frontal face synthesis. The apparatus comprises a decoder that synthesizes a high-resolution (HR) frontal-view (FV) image of a face from received features of a low-resolution (LR) non-frontal-view (NFV) image of the face. The HR FV image is of a higher resolution relative to a lower resolution of the LR NFV image. The decoder includes a main path and an auxiliary path. The auxiliary path produces auxiliary-path features from the received features and feeds the auxiliary-path features produced into the main path for synthesizing the HR FV image. The auxiliary-path features represent a HR NFV image of the face at the higher resolution. As such, an HR identity-preserved frontal face can be synthesized from one or many LR faces with various poses and may be used in types of commercial applications, such as video surveillance.

20 Claims, 7 Drawing Sheets

(51) Int. Cl.
*G06V 10/764* (2022.01)
*G06V 10/82* (2022.01)

(56) References Cited

OTHER PUBLICATIONS

Li, P., et al., "M2FPA: A Multi-Yaw Multi-Pitch High-Quality Dataset and Benchmark for Facial Pose Analysis," IEEE/CVF International Conference on Computer Vision (ICCV), pp. 10043-10051 (2019).

Bansal, N., et al., "CanWe Gain More from Orthogonality Regularizations in Training Deep CNNs?," 32nd Conference on Neural Information Processing Systems, pp. 1-11 (2018).

Goodfellow, I. J., et al., "Generative Adversarial Nets," papers.nips.cc/paper/5423-generative-adversarial-nets.pdf, pp. 1-9 (2014).

Qian, Y., "Unsupervised Face Normalization with Extreme Pose and Expression in the Wild," IEEE/CVF Conference on Computer Vision and Pattern Recognition (CVPR), pp. 9851-9858 (2019).

Tian, Yu, et al., "CR-GAN: Learning Complete Representations for Multi-view Generation," Proceedings of the Twenty-Seventh International Joint Conference on Artificial Intelligence, pp. 942-948 (2018).

Tran, L., et al., "Disentangled Representation Learning GAN for Pose-Invariant Face Recognition," IEEE Conference on Computer Vision and Pattern Recognition (CVPR), pp. 1415-1424 (2017).

Yin, X., et al., "Towards Large-Pose Face Frontalization in the Wild," IEEE International Conference on Computer Vision (ICCV), pp. 3990-3999 (2017).

Yu, X., et al., "Can We See More? Joint Frontalization and Hallucination of Unaligned Tiny Faces," IEEE Transactions on Pattern Analysis and Machine Intelligence, vol. 42, No. 9, pp. 2148-2164 (2020).

Zhuang, W. et al., "FT-GAN: Face Transformation with Key Points Alignment for Pose-Invariant Face Recognition"; May 22, 2019; MDPI.

* cited by examiner

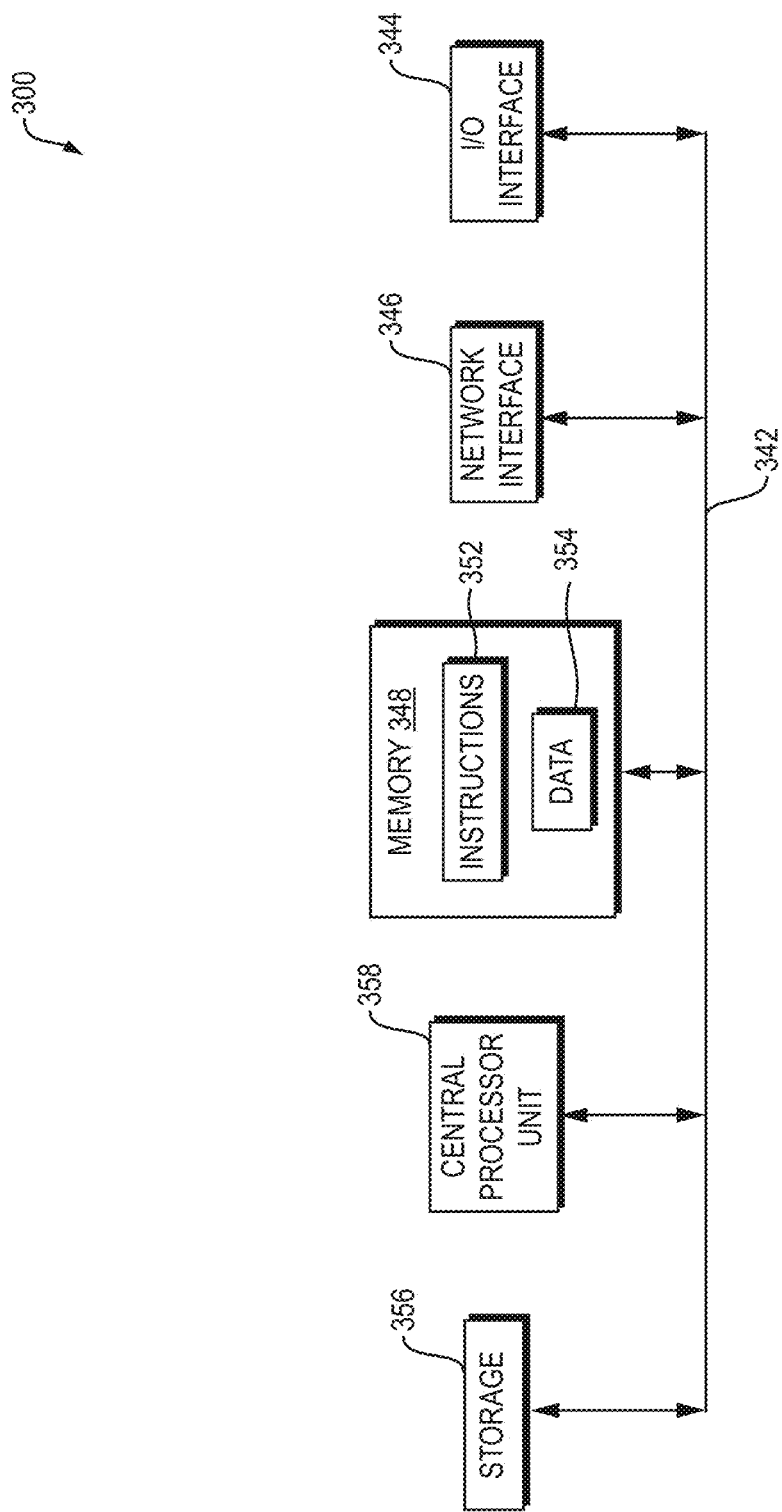

FRONTAL FACE SYNTHESIS FROM LOW-RESOLUTION IMAGES

RELATED APPLICATION

This application claims the benefit of U.S. Provisional Application No. 62/965,164, filed on Jan. 23, 2020. The entire teachings of the above application are incorporated herein by reference.

BACKGROUND

Frontal face synthesis based on two-dimensional (2D) images has attracted a great deal of attention. Frontal face synthesis attempts to recover fontal faces with unconstrained poses. Neural networks are widely used for this purpose. Frontal face synthesis is useful for face recognition, which is one of the most successful applications of computer vision, and has been widely used in personal identification, video surveillance, mobile payment, etc. If faces are captured without users' awareness, poses of the users' faces are typically complex. Frontal face synthesis can improve performance of the face recognition by synthesizing respective frontal faces from such complex poses.

SUMMARY

According to an example embodiment, an apparatus for frontal face synthesis comprises a decoder configured to synthesize a high-resolution (HR) frontal-view (FV) image of a face from received features of a low-resolution (LR) non-frontal-view (NFV) image of the face. The HR FV image is of a higher resolution relative to a lower resolution of the LR NFV image. The decoder includes a main path and an auxiliary path. The auxiliary path is configured to produce auxiliary-path features from the received features and feed the auxiliary-path features produced into the main path for synthesizing the HR FV image, the auxiliary-path features representing a HR NFV image of the face at the higher resolution. It should be understood that an image may have "lower resolution" relative to another image due to a smaller spatial resolution (i.e., size) relative to resolution of the other image or due to a result of degradation of detail(s) in the image, such as blurring of the detail(s), etc.

The main path includes multiple successive main path convolutional stages of respective successive convolutional layers. The multiple successive main path convolutional stages are configured to increase resolution of the received features of the LR NFV image successively. The multiple successive main path convolutional stages include weights that may be trained based on back-propagated pixel-level, local-level, and global-level losses. The back-propagated pixel-level, local-level, and global-level losses are determined based on differences between a given HR FV image and a ground-truth, frontal face image. The given HR FV image is synthesized by the apparatus in a training phase of the apparatus. The pixel-level and local-level losses represent differences between corresponding pixels and corresponding patches, respectively, of the given HR FV and ground-truth, frontal face images. The global-level losses include adversarial and identity-preserving losses.

The main path may include multiple successive main path convolutional stages of respective successive convolutional layers. The multiple successive main path convolutional stages are configured to increase resolution of the received features of the LR NFV image successively. The main path may further include multiple concatenators configured to concatenate (i) respective features output from a respective main path convolutional stage of the multiple successive main path convolutional stages, the respective features output at a respective resolution, and (ii) the auxiliary-path features produced and fed from the auxiliary path at the respective resolution. The main path may further include a main path output convolutional layer configured to transform concatenated features into the HR FV image. The concatenated features may be output at the higher resolution by a given concatenator of the multiple concatenators. The concatenated features are transformed based on a non-linear transformation. The non-linear transformation is learned in a training phase of the apparatus.

The auxiliary path may include an auxiliary convolutional neural network (CNN) with layers configured to up-sample the received features to produce up-sampled features and to extract features from the up-sampled features to produce the auxiliary-path features. The decoder may further include a respective down-sampler configured to down-sample the auxiliary-path features produced in an event the respective features output from the respective main path convolutional stage have a respective resolution that does not match the higher resolution.

The auxiliary path may further include a convolutional layer. In a training phase of the apparatus, the convolutional layer may be employed to reconstruct the HR NFV image from the auxiliary-path features produced. Weights of the auxiliary CNN may be trained, in the training phase, based on back-propagated losses, the back-propagated losses determined in the training phase, based on differences between the HR NFV image reconstructed and a ground-truth, HR NFV image at the higher resolution.

The LR NFV image may be a single LR SV image and the apparatus may further comprise an encoder. The encoder may include a combination of a plurality of convolutional layers configured to produce a feature map of features extracted from the LR SV image. The encoder may further include a pixel-wise sum operator configured to generate the received features by performing a pixel-wise sum of the LR SV image and the feature map produced and to pass the received features to the main path and auxiliary path via an output of the encoder. The main path and auxiliary path may be split at the output.

The apparatus may further comprise a plurality of encoders. Each encoder of the plurality of encoders may include a respective CNN with a shared set of weights. The respective CNN may be configured to extract respective features from a respective LR NFV image of a plurality of LR NFV images. The shared set of weights may be trained, in a training phase of the apparatus, based on orthogonal losses to diversify the respective features extracted. The apparatus may further comprise a concatenator configured to produce the received features by concatenating the respective features extracted by the plurality of encoders and to pass the received features to the main and auxiliary paths of the decoder.

Quality of the HR FV image synthesized may be improved by the respective features extracted from each LR NFV image of the plurality of LR NFV images. The quality may be related to sharpness or clarity of at least one detail of the face in the HR FV image synthesized.

The auxiliary-path features produced and fed by the auxiliary path into the main path may increase high-frequency information of the face in the HR FV image. The high-frequency information may be related to a periocular, nose, or mouth region of the face, or combination thereof.

The main path may be based on a generative adversarial network (GAN). The auxiliary path may enable super-resolution (SR) to be integrated with the GAN to produce a super-resolution integrated generative adversarial network (SRGAN).

According to another example embodiment, a computer-implemented method for frontal face synthesis comprises synthesizing a high-resolution (HR) frontal-view (FV) image of a face from received features of a low-resolution (LR) non-frontal-view (NFV) image of the face. The received features are input to a main path and an auxiliary path split from the main path. The HR FV image is of a higher resolution relative to a lower resolution of the LR NFV image. The synthesizing includes producing, in the auxiliary path, auxiliary-path features from the received features and feeding the auxiliary-path features produced from the auxiliary path into the main path for synthesizing the HR FV image. The auxiliary-path features represent a HR NFV image of the face at the higher resolution.

Alternative method embodiments parallel those described above in connection with the example apparatus embodiment.

According to yet another example embodiment, a non-transitory computer-readable medium for frontal face synthesis has encoded thereon a sequence of instructions which, when loaded and executed by a processor, causes the processor to synthesize a high-resolution (HR) frontal-view (FV) image of a face from received features of a low-resolution (LR) non-frontal-view (NFV) image of the face. The received features are input to a main path and an auxiliary path split from the main path. The HR FV image is of a higher resolution relative to a lower resolution of the LR NFV image. The sequence of instructions is further configured to cause the processor to produce, in the auxiliary path, auxiliary-path features from the received features and feed the auxiliary-path features produced from the auxiliary path into the main path for synthesizing the HR FV image. The auxiliary-path features represent a HR NFV image of the face at the higher resolution.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1C-2 is a block diagram of an example embodiment of the apparatus of FIG. 1A in an operational mode.

FIG. 2 is a flow diagram of an example embodiment of a computer-implemented method for frontal face synthesis.

FIG. 3 is a block diagram of an example internal structure of a computer optionally within an embodiment disclosed herein.

DETAILED DESCRIPTION

A description of example embodiments follows.

An example embodiment enables frontal view synthesis from single or multiple low-resolution (LR) faces with various poses. Generally speaking, an example embodiment may be directed to a super-resolution (SR) integrated generative adversarial network (SRGAN) that learns face frontalization and super-resolution collaboratively to synthesize high-quality, identity-preserved frontal faces, as disclosed further below. Super-resolution recovers a high-resolution image from a low-resolution image by upscaling and/or improving details within the low-resolution image. An example embodiment learns a generator network, such as disclosed below with regard to FIG. 1C-1, that includes a deep encoder and a SR integrated decoder. Features extracted by the deep encoder are passed to the decoder for reconstruction. An example embodiment of a decoder is specially designed to first super-resolve (i.e., recover a high-resolution image from a low-resolution image) non-frontal-view (NFV) images, such as side-view (SV) images, and ultimately utilize the information to reconstruct high-resolution HR frontal-view (FV) faces. To train the model, a three-level loss (i.e., pixel, patch, and global) provides fine-to-coarse coverage that learns a precise non-linear transformation between a LR NFV image of face(s) and an HR FV image of the face(s). Moreover, SRGAN accepts multiple LR profile faces as input by adding an orthogonal constraint in the generator to penalize redundant latent representations and, hence, diversify the learned features space. With these techniques, an example embodiment can generate frontal faces faithful to ground-truth, as disclosed in further detail below.

An example embodiment disclosed herein synthesizes high-quality, identity-preserved frontal faces from low-resolution (LR) faces with various poses. In particular, an example embodiment can synthesize accurate frontal faces with a single LR image under extreme poses (e.g., 90°), such as disclosed below with regard to FIG. 1A.

Figure 1A:
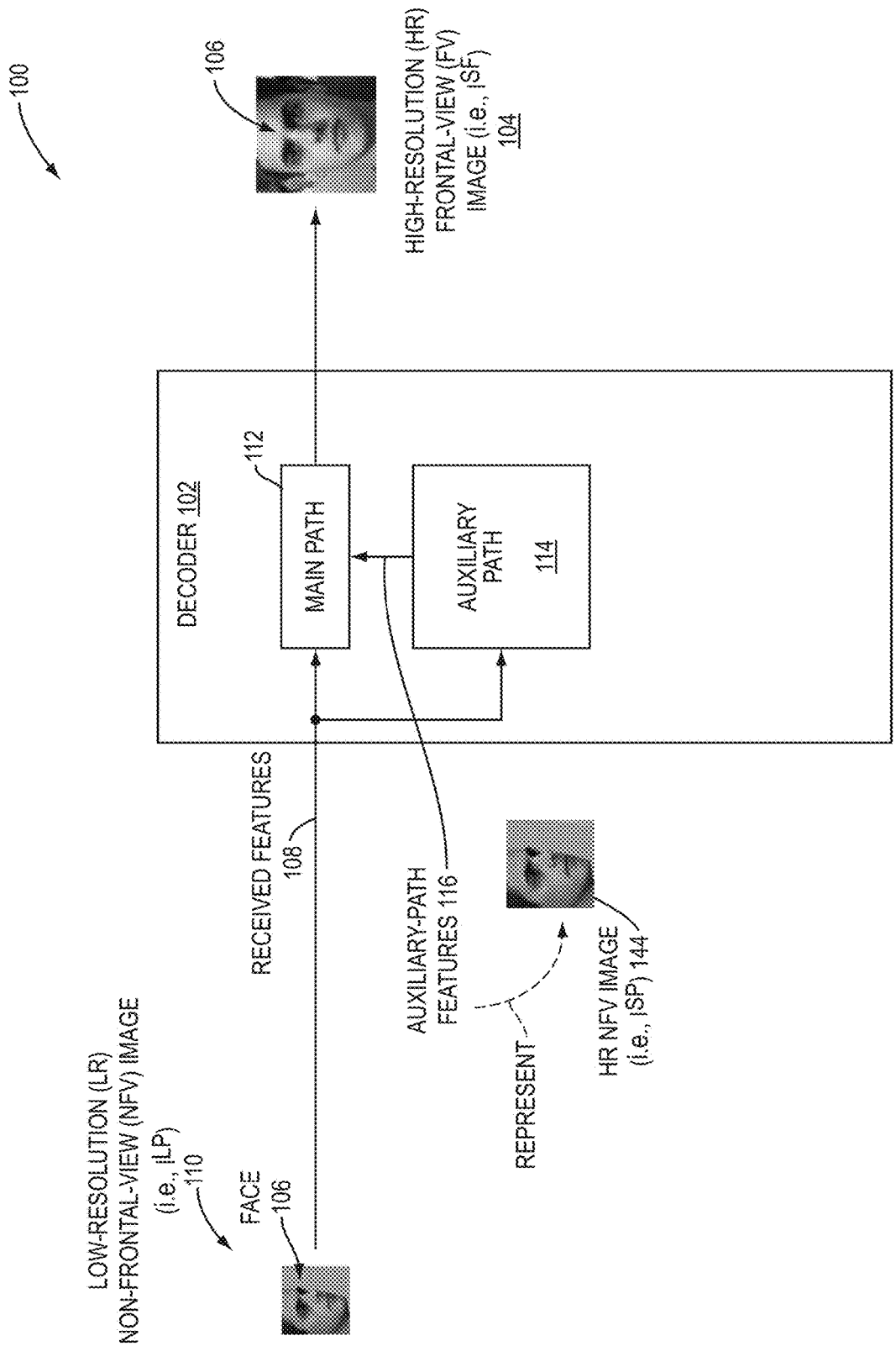
FIG. 1A is a block diagram of an example embodiment of an apparatus for frontal face synthesis.

FIG. 1A is block diagram of an example embodiment of an apparatus 100 for frontal face synthesis. The apparatus 100 may be referred to interchangeably herein as a super-resolution (SR) integrated generative adversarial network (SRGAN). The apparatus 100 comprises a decoder 102 configured to synthesize a high-resolution (HR) frontal-view (FV) image 104 of a face 106 from received features 108 of a low-resolution (LR) non-frontal-view (NFV) image 110 of the face 106. The HR FV image 104 may also be referred to interchangeably herein as a super-resolved front face $I^{SF}$. The HR FV image 104 is of a higher resolution relative to a lower resolution of the LR NFV image 110. The decoder 102 includes a main path 112 and an auxiliary path 114. The auxiliary path 114 is configured to produce auxiliary-path features 116 from the received features 108 and feed the auxiliary-path features 116 produced into the main path 112 for synthesizing the HR FV image 104. The auxiliary-path features represent a HR NFV image 144 of the face 106 at the higher resolution. The auxiliary path 114 may be referred to interchangeably herein as a super-resolution (SR) module or side-view SR branch. Super-resolution includes recovering a high-resolution image from a low-resolution image by upscaling and/or improving details within the low-resolution image. The auxiliary path may be considered to be a "branch" as it splits off from the main path 112.

An example embodiment of the apparatus 100 may be employed in many types of commercial applications. For example, the LR NFV image 110 of the face 106 may be a LR NFV image of a criminal's face, and the HR FV image 104 can be an HR FV image of the criminal's face to assist law enforcement. An example embodiment can be applied in many interesting apps for entertainment, such as editing the pose of faces in photos. An example embodiment can be utilized to help facial recognition in a surveillance system, where facial images are usually low-quality and under extreme poses. It should be understood, however, that an example embodiment disclosed herein. Further, while the face 106 in the LR NFV image 110 may be under an extreme pose (e.g., 90°), it should be understood that such pose need not be at 90° and that such pose is not limited to being as shown in figures disclosed herein. Furthermore, an example embodiment can accept one or multiple inputs and improves the HR FV image 104 with each sample, that is, with each LR NFV image 110 that is added (i.e., input), such as disclosed below with regard to FIG. 1B.

Figure 1B:
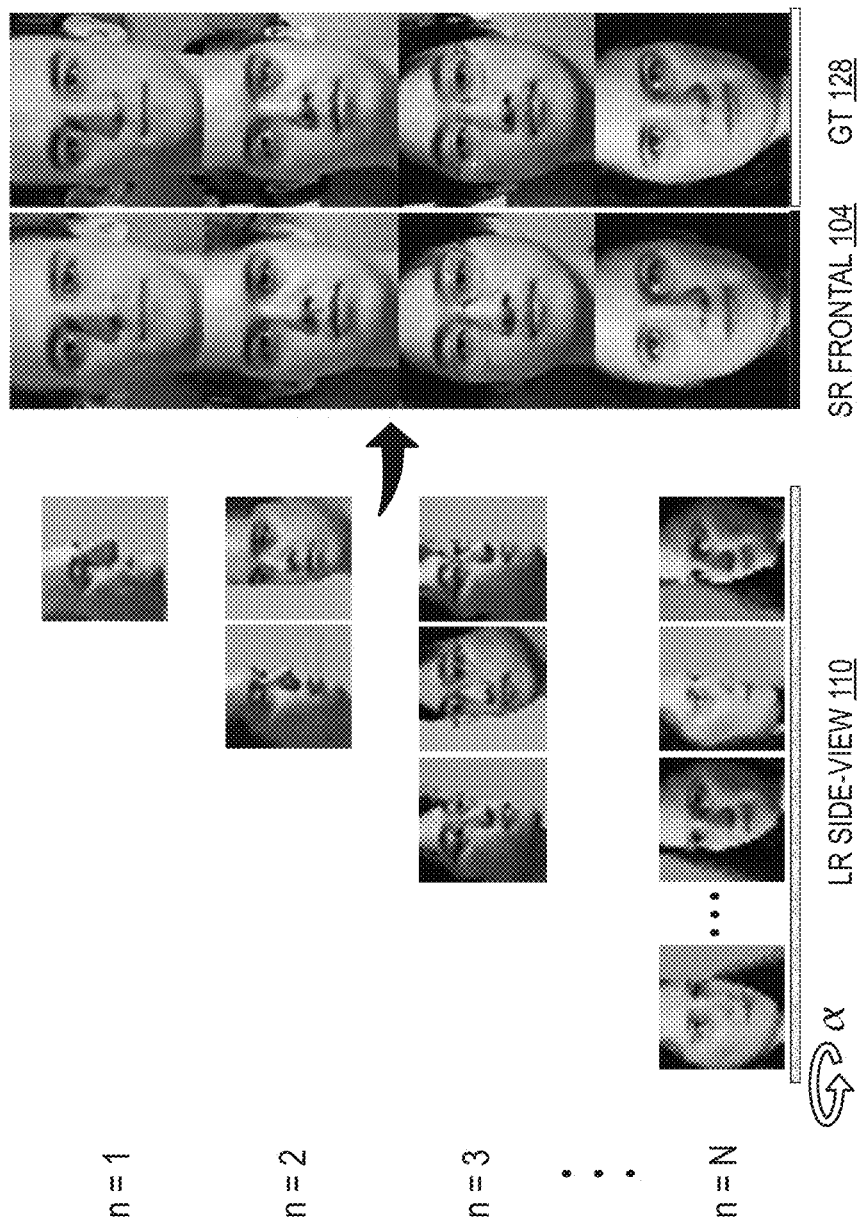
FIG. 1B is block diagram of an example embodiment of the single-to-many input capability of the apparatus of FIG. 1A.

FIG. 1B is block diagram of an example embodiment of the single-to-many input capability of the apparatus 100 of FIG. 1A. The apparatus 100 (SRGAN) can accept N low-quality, side-view faces, of arbitrary angle, as input, such as the N LR side-view images 110 of faces shown in FIG. 1B. The apparatus 100 can synthesize high-quality HR frontal view images of faces 104 from one input, then improves with more added, such as shown in FIG. 1B which shows the N super-resolved (SR) fontal view images 104 of faces that are high-quality HR frontal view images of faces as shown relative to respective ground truth (GT) images 128 of the faces. An example embodiment of the apparatus 100 of FIG. 1A, disclosed above, can accept multiple low-resolution profile faces as input, while improving the quality of generated images with each sample added, such as shown in FIG. 1B. It should be understood that pose of the input faces are not limited to the poses of the faces in the LR side-view faces of FIG. 1B and that the poses of input faces can be arbitrary.

With reference to FIG. 1A, an example embodiment of the apparatus 100 disclosed herein has many advantages. An example embodiment disclosed further below can recover HR images from tiny faces with detailed information, such as fine skin details, clear shapes, and sharp edges, and generates more realistic and identity-preserving faces with better image quality (sharper and clearer details). An example embodiment integrates the auxiliary path 114 (also referred to interchangeably herein as a super-resolution module or side-view SR branch) to provide fine details of non-frontal views (e.g., side-views) in high-resolution space, which helps the apparatus 100 (also referred to interchangeably herein as a model, network, or SRGAN) to reconstruct high-frequency information of faces (i.e., periocular, nose, and mouth regions). An example embodiment introduces a three-level loss (i.e., pixel, patch, and global-based) to learn more precise non-linear transformations from low-resolution side-views to high-resolution frontal views, such as the pixel-level 122, local-level 124, and global-level 126 losses disclosed below with reference to FIG. 1C-1.

Figures 1, 1C:
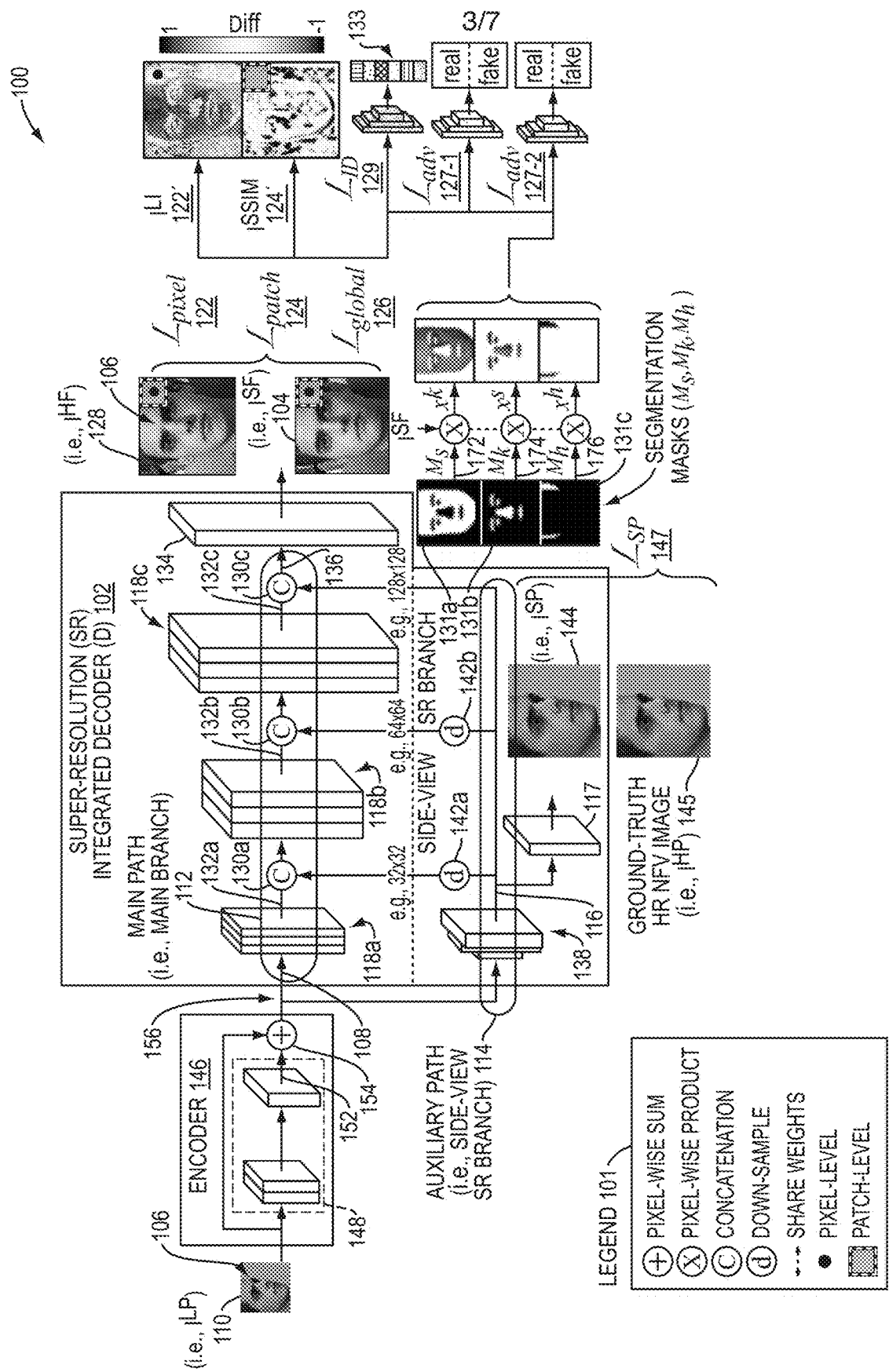
FIG. 1C-1 is a block diagram of an example embodiment of the apparatus of FIG. 1A in a training mode.
Figures 1, 1C, 2:
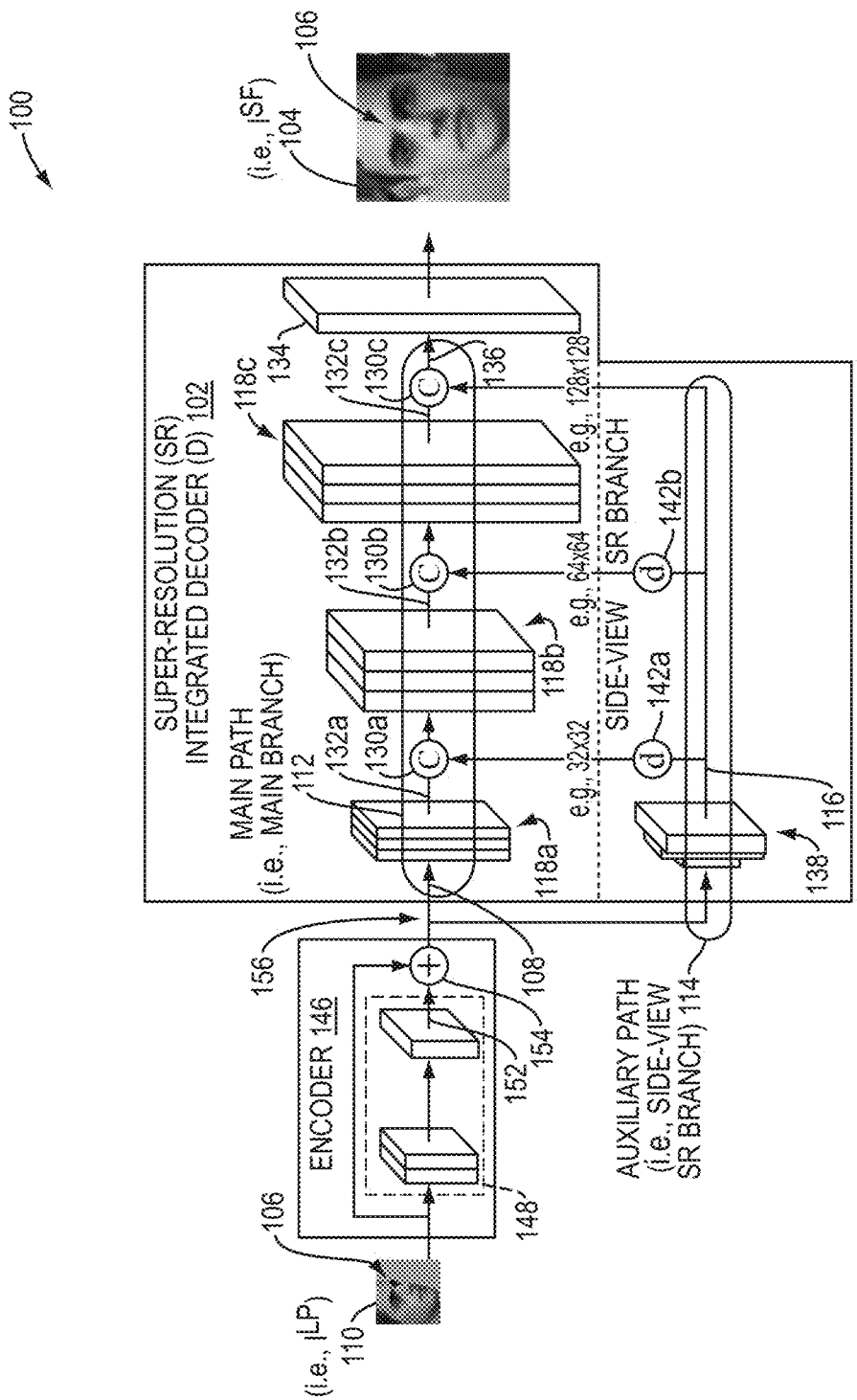

FIG. 1C-1 is a block diagram of an example embodiment of the apparatus 100 of FIG. 1A in a training mode (also referred to interchangeably herein as a training phase). FIG. 1C-2, disclosed further below, is a block diagram of the apparatus 100 of FIG. 1A in an operational mode. In the training mode, a collection of low-resolution images of non-frontal views of faces are input to the apparatus 100. In the collection, the faces may be faces of different people of various skin tones and the faces may have various poses. In the training mode, ground-truth high-resolution images of such faces in corresponding non-frontal and frontal views are employed to determine losses relative to respective synthesized high-resolution versions of same as synthesized by the apparatus 100. Such losses may be back-propagated to learn/train weights of convolution networks of the apparatus 100 as disclosed herein. As back-propagation is known in the art, details with respect to same are not disclosed herein to reduce complexity. Once trained, the apparatus 100 may be considered to be in an operational mode as elements thereof are static, such as weights of the convolutional networks thereof, that, in the operational mode, employ values for the weights as learned/trained during the training mode. An example embodiment of the apparatus 100 in the operational mode is disclosed further below with regard to FIG. 1C-2 and has training-mode specific elements of the apparatus 100 removed relative to FIG. 1C-1, as such training-mode specific elements are not employed in the operational mode.

Continuing with reference to FIG. 1C-1, the block diagram includes a legend 101 of symbols employed in the block diagram. As disclosed above with reference to FIG. 1A, the apparatus 100 comprises a decoder 102 configured to synthesize a HR FV 104 of a face 106 from received features 108 of a LR NFV image 110 of the face 106. The HR FV image 104 is of a higher resolution relative to a lower resolution of the LR NFV image 110. The block diagram of FIG. 1C-1 discloses a framework of the apparatus 100 wherein, given a non-frontal (i.e., profile) LR face $I^{LP}$, that is, the LR NFV image 110, single-input (SI) SRGAN, disclosed in detail further below, synthesizes a high-quality frontal face $I^{SF}$, that is the HR FV image 104, by integrating a side-view SR, that is, the auxiliary path 114. Further, the three-level loss, namely, pixel-level 122, local-level 124, and global-level 126 losses (i.e., $L_{pix}$, $L_{patch}$, and $L_{global}$, respectively), provides fine-to-coarse coverage, as disclosed further below.

Continuing with FIG. 1C-1, the decoder 102 includes the main path 112 and the auxiliary path 114. The auxiliary path 114 is configured to produce auxiliary-path features 116 from the received features 108 and feed the auxiliary-path features 116 produced into the main path 112 for synthesizing the HR FV image 104. The auxiliary-path features 116 represent a HR NFV image 144 of the face 106. The main path 112 includes multiple successive main path convolutional stages 118a, 118b, 118c of respective successive convolutional layers.

The multiple successive main path convolutional stages 118a, 118b, 118c are configured to increase resolution of the received features 108 of the LR NFV image 110 successively. The multiple successive main path convolutional stages 118a, 118b, 118c include weights (not shown) trained based on back-propagated pixel-level 122, local-level 124, and global-level 126 losses. The back-propagated pixel-level 122, local-level 124, and global-level 126 losses are determined based on differences between a given HR FV image, such as the HR FV image 104, and a ground-truth, frontal face image 128. The given HR FV image is synthesized by the apparatus 100 in a training phase of the apparatus 100. The pixel-level 122 and local-level 124 losses represent differences between corresponding pixels and corresponding patches, respectively, of the given HR FV and ground-truth, frontal face images. The global-level losses 126 include adversarial and identity-preserving losses.

The main path 112 further includes multiple concatenators 130a, 130b, 130c configured to concatenate (i) respective features 132a, 132b, 132c output from a respective main path convolutional stage of the multiple successive main path convolutional stages 118a, 118b, 118c, the respective features 132a, 132b, 132c output at a respective resolution, and (ii) the auxiliary-path features 116 produced and fed from the auxiliary path 114 at the respective resolution. The main path 112 further includes a main path output convolutional layer 134 configured to transform concatenated features 136 into the HR FV image 104. The concatenated features 136 are output at the higher resolution by a given concatenator 130c of the multiple concatenators 130a, 130b, 130c. The concatenated features 136 are transformed based on a non-linear transformation. The non-linear transformation is learned in a training phase of the apparatus 100.

The auxiliary path 114 includes an auxiliary convolutional neural network (CNN) 138 with layers configured to up-sample the received features 108 to produced up-sampled features (not shown) and to extract features from the up-sampled features to produce the auxiliary-path features 116. The decoder 102 further includes a respective down-sampler 142a, 142b configured to down-sample the auxiliary-path features 116 produced and fed into the main path 112, in an event the respective features 132a, 132b output from the respective main path convolutional stage 118a, 118b have a respective resolution that does not match the higher resolution. As such, respective features input to a given concatenator of the multiple concatenators 130a, 130b, 130c have the same resolution for concatenation.

In a training phase of the apparatus 110, the auxiliary path 114 is configured to employ a convolutional layer 117 configured to reconstruct the HR NFV image 144 from the auxiliary-path features 116 produced. The weights of the auxiliary CNN 138 may be trained, in the training phase, based on back-propagated losses determined, in the training phase, based on differences between the HR NFV image 144 (i.e., $I^{SP}$), reconstructed and output from the convolutional layer 117, and a ground-truth, HR NFV image 145 ($I^{HP}$) at the higher resolution. Such differences are pixel-level losses $L^{SP}$ 147, represented as:

$$|I_{w,h}^{HP} - I_{w,h}^{SP}|$$

in equation (1), disclosed further below.

The apparatus 100 further comprises an encoder 146. The encoder 146 may include a combination 148 of a plurality of convolutional layers configured to produce a feature map 152 of features extracted from the LR NFV image 110. The encoder may further include a pixel-wise sum operator 154 configured to generate the received features 108 by performing a pixel-wise sum of the LR NFV image 110 and the feature map 152 produced and to pass the received features 108 to the main path 112 and auxiliary path 114 via an output 156 of the encoder 146. The main path 112 and auxiliary path 114 are split at the output 156.

The auxiliary-path features 116 produced and fed by the auxiliary path 114 into the main path 112 increase high-frequency information of the face 106 in the HR FV image 104. The high-frequency information may be related to a periocular, nose, or mouth region of the face 106, or combination thereof.

FIG. 1C-2 is a block diagram of an example embodiment of the apparatus 100 of FIG. 1A in an operational mode. As such, elements of the apparatus 100 shown in FIG. 1C-1 that are used in the training mode of the apparatus 100 (e.g., the convolutional layer 117, ground-truth images 128 and 145, etc.) are not included in the block diagram of FIG. 1C-2 as such elements are not employed in the operational mode. As in FIG. 1C-1, disclosed above, the apparatus 100 in FIG. 1C-2 comprises a decoder 102 configured to synthesize the HR FV 104 of the face 106 from received features 108 of the LR NFV image 110 of the face 106. The HR FV image 104 is of the higher resolution relative to the lower resolution of the LR NFV image 110. The decoder 102 includes the main path 112 and the auxiliary path 114. The auxiliary path 114 is configured to produce the auxiliary-path features 116 from the received features 108 and feed the auxiliary-path features 116 produced into the main path 112 for synthesizing the HR FV image 104. The auxiliary-path features 116 represent the HR NFV image 144 (i.e., $I^{SP}$), disclosed above, namely a synthesized HR image of a NFV of the face 106 from the LR NFV image 110 of the face 106.

As disclosed further below, according to an example embodiment, the main path 112 is based on a generative adversarial network (GAN) and the auxiliary path 114 enables super-resolution (SR) to be integrated with the GAN to produce a super-resolution integrated generative adversarial network (SRGAN). Further details regarding the SRGAN are disclosed further below. A single LR NFV image may input to the apparatus 100, such as the LR NFV image 100 of FIGS. 1C-1 and 1C-2, disclosed above, in which case the framework of the apparatus may be referred to as a single-image (SI) SRGAN. To leverage the complimentary information of different poses, an example embodiment referred to as multi-image (MI) SRGAN can penalize redundant latent representations and explore the maximum information of the LR images under arbitrary poses, as disclosed in detail further below. MI SRGAN may use the same decoder 102 as SI SRGAN, as disclosed in FIGS. 1C-1 and 1C-2, above. An example embodiment of the framework of MI SRGAN is shown in FIGS. 1D-F, disclosed below.

Figure 1E:
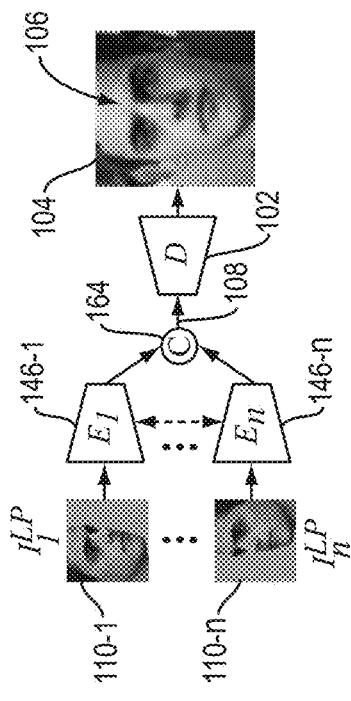
FIGS. 1D-F are block diagrams of example embodiments of fusing image inputs.
Figure 1D:
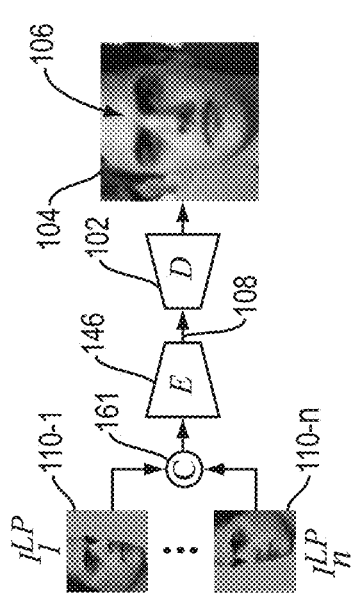

FIG. 1D is a block diagram of an example embodiment of the apparatus 100 of FIG. 1C-1 and FIG. 1C-2, disclosed above, in which multiple images of faces of arbitrary poses are input to the encoder 146. Even by naively fusing multiple image inputs, such as the LR NFV images (110-1, . . . 110-n), and inputting same via a concatenator 161 to the encoder 146, MI SRGAN can outperform SI SRGAN in quality and identity preservation. Results can again be boosted by fusing features after the encoder 146, such as disclosed below with regard to FIG. 1E.

FIG. 1E is a block diagram of an example embodiment of the apparatus 100 of FIG. 1C-1 and FIG. 1C-2, disclosed above, in which features from a plurality of encoders (146-1, . . . 146-n) are fused via a concatenator 164 an input as the received features 108 to the decoder 102. Such multiple encoders may employ shared weights (not shown). Constraints may be employed to force diversification of the features, such as disclosed below with regard to FIG. 1F, again, yielding a boost.

Figure 1F:
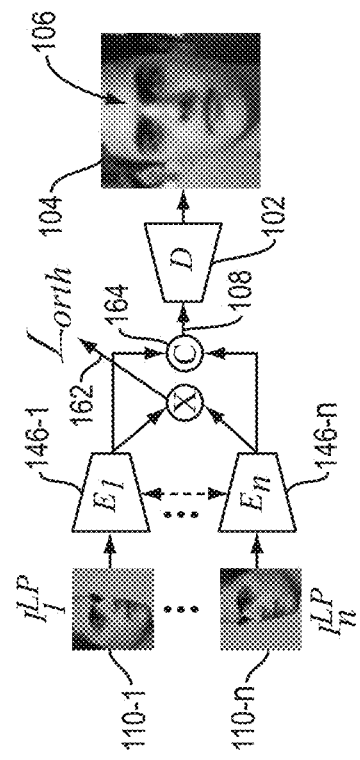
Figure 2:
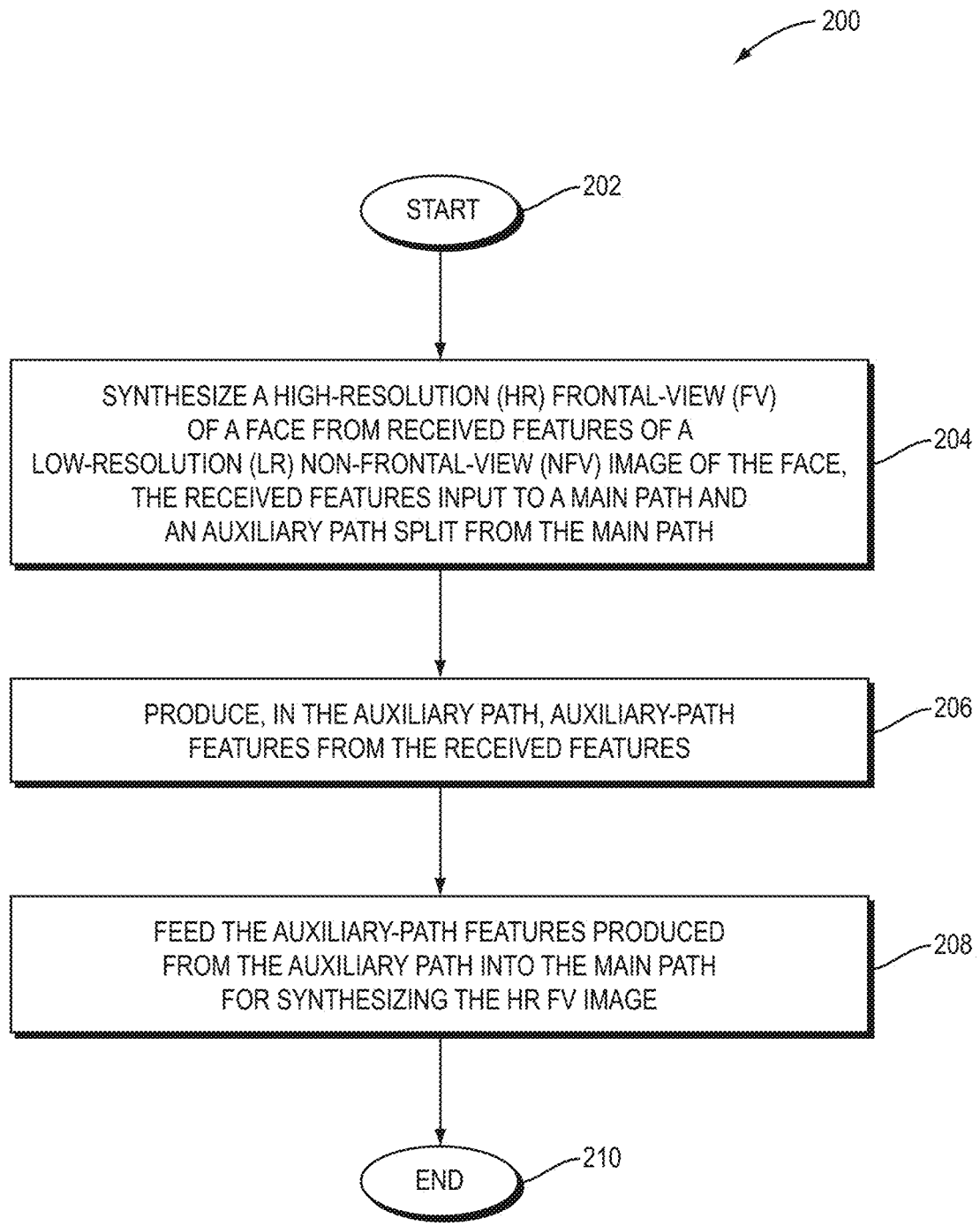

FIG. 1F is block diagram of an example embodiment of the framework of FIG. 1C-1 and FIG. 1C-2 in which a plurality of encoders (146-1, . . . 146-n) are employed as the encoder 146. In the example embodiment, each encoder of the plurality of encoders includes a respective CNN (not shown) with a shared set of weights (not shown). The respective CNN is configured to extract respective features from a respective LR NFV image of a plurality of LR NFV images (110-1, . . . 110-n), the shared set of weights may be trained, in training phase of the apparatus 100, based on orthogonal losses 162 to diversify the respective features extracted. In the example embodiment, a concatenator 164 is configured to produce the received features 108 by concatenating the respective features extracted by the plurality of encoders (146-1, . . . 146-$n$) and passing the received features 108 to the main and auxiliary paths of the decoder 102 of FIG. 1C-1 and FIG. 1C-2, disclosed above. The quality of the HR FV image 104 synthesized is improved by the respective features extracted from each LR NFV image of the plurality of LR NFV images (110-1, . . . 110-$n$). The quality may be related to sharpness or clarity of at least one detail of the face 106 in the HR FV image 104 synthesized.

Further details regarding FIGS. 1A-F are disclosed further below, following a general overview of conventional works related to face synthesis.

Advances in face rotation, and other face-based generative tasks, have grown more frequent with further advances in the topic of deep learning as a whole. Even with impressive milestones achieved when synthesizing faces, the importance of preserving identity in most real-world applications should not be overlooked. Furthermore, nor should the increase in difficulty for data with more obscured faces, heavier poses, and lower image quality. Previous works tend to focus on samples with varying poses, but under the assumption faces are of high-quality. An example embodiment aims to synthesize a high-resolution (HR), identity-preserved frontal face from one or many low-resolution (LR) faces with various poses. An example embodiment integrates a super-resolution (SR) side-view module into super-resolution integrated generative adversarial network (SRGAN) to provide fine details of side-views in HR space, which helps a model reconstruct high-frequency information of faces (i.e., periocular, nose, and mouth regions). Furthermore, a three-level loss (i.e., pixel, patch, and global-based) is introduced to learn precise non-linear transformations from LR side-views to HR frontal. Moreover, SRGAN accepts multiple LR profile faces as input, while improving with each sample added. Additional gain is squeezed by adding an orthogonal constraint in the generator to penalize redundant latent representations and, hence, diversify the learned features space.

Face-based generative tasks (e.g., face rotation (Rui Huang, Shu Zhang, Tianyu Li, and Ran He. Beyond Face Rotation: Global and Local Perception GAN for Photorealistic and Identity Preserving Front View Synthesis. In *IEEE International Conference on Computer Vision (ICCV)*, 2017; Luan Tran, Xi Yin, and Xiaoming Liu. Disentangled representation learning GAN for pose-invariant face recognition. In *IEEE Conference on Computer Vision and Pattern Recognition (CVPR)*, 2017; Yibo Hu, Xiang Wu, Bing Yu, Ran He, and Zhenan Sun. Pose-guided photorealistic face rotation. In *CVPR*, 2018), hallucination (Yu Chen, Ying Tai, Xiaoming Liu, Chunhua Shen, and Jian Yang. Fsrnet: End-to-end learning face SR with facial priors. In *CVPR*, 2018; Adrian Bulat and Georgios Tzimiropoulos. Super-fan: Integrated facial landmark localization and SR of real-world low resolution faces in arbitrary poses with GANs. In *CVPR*, 2018; Yu Yin, Joseph P Robinson, Yulun Zhang, and Yun Fu. Joint super-resolution and alignment of tiny faces. *Conference on Artificial Intelligence (AAAI)*, 2020), and attribute editing (Yunjey Choi, Minje Choi, Munyoung Kim, Jung-Woo Ha, Sunghun Kim, and Jaegul Choo. Stargan: Unified generative adversarial networks for multi-domain image-to-image translation. In *CVPR*, 2018; Zhenliang He, Wangmeng Zuo, Meina Kan, Shiguang Shan, and Xilin Chen. Attgan: Facial attribute editing by only changing what you want. *IEEE Transactions on Image Processing*, 2019) have gained more of the spotlight in research communities based on advancements via deep learning. Even still, the practical significance of identity-preservation is frequently overlooked, which especially poses great challenges for face images with large poses and low-quality. On this note, some researchers recently made progress in the synthesis of frontal faces with large pose variations (Rui Huang, Shu Zhang, Tianyu Li, and Ran He. Beyond face rotation: Global and local perception GAN for photorealistic and identity preserving front view synthesis. In *IEEE International Conference on Computer Vision (ICCV)*, 2017; Peipei Li, Xiang Wu, Yibo Hu, Ran He, and Zhenan Sun. M2fpa: A multi-yaw multi-pitch high-quality database and benchmark for facial pose analysis. 2019; Yichen Qian, Weihong Deng, and Jiani Hu. Unsupervised face normalization with extreme pose and expression in the wild. In *Proceedings of the IEEE Conference on Computer Vision and Pattern Recognition*, pages 9851-9858, 2019). However, such past works that focus on faces with large poses assume images of high-quality. Thus, existing methods suffer from loss of identity information when learning a highly non-linear transformation that maps spaces of low-resolution LR) side-views to high-resolution (HR) frontal-views.

Either low quality in input or large pose discrepancy between views makes the frontalization problem challenging. Besides, it is often more difficult to synthesize accurate frontal faces with a single LR image under extreme poses. Hence, it is useful to have a model that accepts both one and multiple inputs and gains more improvement with each sample added. These three challenges and the proposed solutions for each of them, respectively, are disclosed further below.

Existing face frontalization methods (Yibo Hu, Xiang Wu, Bing Yu, Ran He, and Zhenan Sun. Pose-guided photorealistic face rotation. In *CVPR*, 2018. 1; Rui Huang, Shu Zhang, Tianyu Li, and Ran He. Beyond face rotation: Global and local perception GAN for photorealistic and identity preserving front view synthesis. In *IEEE International Conference on Computer Vision (ICCV)*, 2017; Xi Yin, Xiang Yu, Kihyuk Sohn, Xiaoming Liu, and Manmohan Chandraker. Towards large-pose face frontalization in the wild. In *IEEE International Conference on Computer Vision (ICCV)*, 2017 Peipei Li, Xiang Wu, Yibo Hu, Ran He, and Zhenan Sun. M2fpa: A multi-yaw multi-pitch high-quality database and benchmark for facial pose analysis. 2019) tend to set the generator as an encoder-decoder with skip connections (i.e., U-Net (Olaf Ronneberger, Philipp Fischer, and Thomas Brox. U-net: Convolutional networks for biomedical image segmentation. In *The Medical Image Computing and Computer Assisted Intervention Society*, 2015). This preserves low-frequency information (i.e., shape and uniqueness of objects) by skip connections, while cascades of convolutional-layers (cony-layers) learn high-frequency features. However, precise low-frequency information is lost when faced with LR inputs. Thus, U-Net architectures lead to inaccuracies at inference in such cases (e.g., blurred structures and loss of identity). To properly preserve details and the subject identity of a LR face, an example embodiment leverages a super-resolution (SR) module in parallel to better provide precise low-frequency information and high-frequency details. The effectiveness of the proposed joint-learning method is met with improved quality of high-frequency content, while preserving the identity of the subject. An example embodiment is understood to be the first to address the problem of rotating profile faces and SR jointly, and such that the tasks complement one another.

Another challenge in frontal face synthesis is the highly non-linear transformation from side-to-front view due to large pose discrepancy, leading to imprecise facial structures at inference. Previous works usually use pixel-level (e.g., L1 or L2), identity, and adversarial losses to learn mappings between views. However, models trained based on such losses typically have low confidence in differentiating structural information (Rui Huang, Shu Zhang, Tianyu Li, and Ran He. Beyond face rotation: Global and local perception GAN for photorealistic and identity preserving front view synthesis. In *IEEE International Conference on Computer Vision (ICCV)*, 2017; Xuebin Qin, Zichen Zhang, Chenyang Huang, Chao Gao, Masood Dehghan, and Martin Jagersand. Basnet: Boundary-aware salient object detection. In *CVPR, 2019*). To capture detailed facial structures as well as identity information of the subject, an example embodiment employs a three-level loss (i.e., pixel, local, and global losses). The pixel-level loss treats each pixel equally and helps with convergence (i.e., L1 loss), and the patch-level loss pays more attention to image structures (i.e., the edge and shape of facial components), i.e., Structural Similarity Index (SSIM) (Zhou Wang, Alan C. Bovik, Hamid R. Sheikh, Eero P. Simon-celli, et al. Image quality assessment: from error visibility to structural similarity. *IEEE Transactions on Image Processing (TIP)*, 13(4):600-612, 2004). The global-level losses, made-up of identity-preserving and adversarial losses, guide training from a top-level, allowing for the synthesis of photo-realistic frontal faces with unique identity preserved.

Moreover, synthesizing HR and identity preserving frontal views from a single image is often difficult due to extreme poses in LR faces. In many real-life scenarios (e.g., surveillance system), there are multiple images per subject that can be used in a complimentary fashion to further improve the synthesis (Luan Tran, Xi Yin, and Xiaoming Liu. Disentangled representation learning GAN for pose-invariant face recognition. In *IEEE Conference on Computer Vision and Pattern Recognition (CVPR)*, 2017). However, most existing face frontalization algorithms only handle one image at each time. To further boost the quality of the face, an example embodiment of a model is extended to accept multiple faces as input, such as disclosed above with reference to FIG. 1B. Since all generators in the proposed model share the same weights, the input image could have arbitrary poses. Instead of employing naive fusion methods (e.g., image- or feature-level concatenation (Viswanath K. Reddy and Shruthi B. Gangal. Concatenation of multiple features for face recognition. In *International Conference on Smart Trends for Information Technology and Computer Communications*, pages 558-564. Springer, 2016), or feature-level summation (Luan Tran, Xi Yin, and Xiaoming Liu. Disentangled representation learning GAN for pose-invariant face recognition. In *IEEE Conference on Computer Vision and Pattern Recognition (CVPR)*, 2017), an example embodiment uses orthogonal regularization in an example embodiment of a generative adversarial network (GAN)-based model for optimal training and to learn features of broader span (N. Bansal, X. Chen, and Z. Wang. Can We Gain More from Orthogonality Regularizations in Training Deep CNNs? *arXiv preprint arXiv:* 1810.09102, October 2018). An example embodiment is understood to be first to introduce this in training a GAN-based model, namely, a super-resolution integrated generative adversarial network (SR-GAN).

In summary, example embodiments make the following contributions:

1. An example embodiment of a novel SR-integrated Generative Adversarial Net-work (SRGAN) is proposed to tackle the challenge of tiny face frontalization. An example embodiment contains a multi-tasking model which learns the frontalization and face super-resolution collaboratively.

2. An example embodiment introduces a three-level (i.e., pixel-, patch-, global-based) loss to learn a precise non-linear transformation between LR side-view and HR frontal-view faces.

3. An example embodiment extends one-to-multiple inputs: more LR inputs better preserve identity and improve synthesis quality using early or late fusion. Furthermore, an example embodiment adds constraints to diversify the features (i.e., orthogonal regularization) for further improvement.

Generative Adversarial Network

Introduced in Ian Goodfellow, Jean Pouget-Abadie, Mehdi Mirza, Bing Xu, David Warde-Farley, Sherjil Ozair, Aaron Courville, and Yoshua Bengio. Generative adversarial nets. In *Advances in Neural Information Processing Systems (NIPS)*, pages 2672-2680, 2014, GANs train by facing a generator (G) off against discriminator (D) in a min-max game, where G aims to generate images indistinguishable from real x from noise z. Recently, GANs have been successfully applied to various tasks like image-to-image translation (Phillip Isola, Jun-Yon Zhu, Tinghui Zhou, and Alexei A. Efros. Image-to-image translation with conditional adversarial networks. In *CVPR, 2017*), image super-resolution (Christian Ledig, Lucas Theis, Ferenc Husz'ar, Jose Caballero, Andrew Cunningham, Alejandro Acosta, Andrew Aitken, Alykhan Tejani, Johannes Totz, Zehan Wang, et al. Photo-realistic single image super-resolution using a generative adversarial network. In *CVPR, 2017*), and image inpainting (Deepak Pathak, Philipp Krähenbühl, Jeff Donahue, Trevor Darrell, and Alexei A. Efros. Context encoders: Feature learning by inpainting. In *CVPR, 2016*). An example embodiment develops super-resolved frontal face synthesis method(s) based on GAN.

Face Frontalization

Face frontalization is a challenging task due to incomplete information in face images when captured from a side-view. Previous attempts at the problem can be characterized in two-fold: traditional (i.e., shallow) methods and deep learning approaches. Traditional methods include 3D Morphable Model (3DMM) based methods (Akshay Asthana, Tim K Marks, Michael J Jones, Kinh H Tieu, and MV Rohith. Fully automatic pose-invariant face recognition via 3d pose normalization. In *IEEE International Conference on Computer Vision (ICCV)*, pages 937-944. IEEE, 2011; Shaoxin Li, Xin Liu, Xiujuan Chai, Haihong Zhang, Shihong Lao, and Shiguang Shan. Morphable displacement field based image matching for face recognition across pose. In *European Conference on Computer Vision (ECCV)*, pages 102-115. Springer, 2012; Paul Koppen, Zhen-Hua Feng, Josef Kittler, Muhammad Awais, William Christmas, Xiao-Jun Wu, and He-Feng Yin. Gaussian mixture 3d morphable face model. *Pattern Recognition*, 74:617-628, 2018) and statistical-based models (Luan Tran, Xi Yin, and Xiaoming Liu. Disentangled representation learning GAN for pose-invariant face recognition. In *IEEE Conference on Computer Vision and Pattern Recognition (CVPR)*, 2017; Christos Sagonas, Yannis Panagakis, Stefanos Zafeiriou, and Maja Pantic. Robust statistical face frontalization. In *IEEE International Conference on Computer Vision (ICCV)*, pages 3871-3879, 2015). The remainder of the literature review disclosed below is focused on the more relevant, state-of-the-art deep learning works (Meina Kan, Shiguang Shan, Hong Chang, and Xilin Chen. Stacked progressive auto-encoders (spae) for face recognition across poses. In *IEEE Conference on Computer Vision and Pattern Recognition*

(*CVPR*), pages 1883-1890, 2014; Luan Tran, Xi Yin, and Xiaoming Liu. Disentangled representation learning GAN for pose-invariant face recognition. In *IEEE Conference on Computer Vision and Pattern Recognition (CVPR)*, 2017; Xi Yin, Xiang Yu, Kihyuk Sohn, Xiaoming Liu, and Manmohan Chandraker. Towards large-pose face frontalization in the wild. In *IEEE International Conference on Computer Vision (ICCV)*, 2017; Zhenyao Zhu, Ping Luo, Xiaogang Wang, and Xiaoou Tang. Deep learning identity-preserving face space. In *IEEE International Conference on Computer Vision (ICCV)*, pages 113-120, 2013; Zhenyao Zhu, Ping Luo, Xiaogang Wang, and Xiaoou Tang. Multi-view perceptron: a deep model for learning face identity and view representations. In *Advances in Neural Information Processing Systems (NIPS)*, pages 217-225, 2014; Xiangyu Zhu, Zhen Lei, Junjie Yan, Dong Yi, and Stan Z. Li. High-fidelity pose and expression normalization for face recognition in the wild. In *IEEE Conference on Computer Vision and Pattern Recognition (CVPR)*, 2015).

Some GAN-based frontal-face synthesizers are known (Jeff Donahue, Philipp Krähenbühl, and Trevor Darrell. Adversarial feature learning. *arXiv preprint arXiv:* 1605.09782, 2016; Rui Huang, Shu Zhang, Tianyu Li, and Ran He. Beyond face rotation: Global and local perception GAN for photorealistic and identity preserving front view synthesis. In *IEEE International Conference on Computer Vision (ICCV)*, 2017; Yu Tian, Xi Peng, Long Zhao, Shaoting Zhang, and Dimitris N Metaxas. CR-GAN: learning complete representations for multi-view generation. *International Joint Conferences on Artificial Intelligence (IJCAI)*, 2018; Luan Tran, Xi Yin, and Xiaoming Liu. Disentangled representation learning GAN for pose-invariant face recognition. In *IEEE Conference on Computer Vision and Pattern Recognition (CVPR)*, 2017). BiGAN jointly learns G and an inference model (Jeff Donahue, Philipp Krähenbühl, and Trevor Darrell. Adversarial feature learning. *arXiv preprint arXiv:* 1605.09782, 2016). Nonetheless, in practice, BiGAN produces poor quality due to finite data and limited model capacity (Luan Tran, Xi Yin, and Xiaoming Liu. Disentangled representation learning GAN for pose-invariant face recognition. In *IEEE Conference on Computer Vision and Pattern Recognition (CVPR)*, 2017). DR-GAN (Luan Tran, Xi Yin, and Xiaoming Liu. Disentangled representation learning GAN for pose-invariant face recognition. In *IEEE Conference on Computer Vision and Pattern Recognition (CVPR)*, 2017) learned identity-preserved representations to synthesize multi-view images. However, the encoder feeds the decoder, which depends on the training data—an impractical restriction for the inability to generalize to new data. TP-GAN has two path-ways for frontal face generation to capture local and global features (Rui Huang, Shu Zhang, Tianyu Li, and Ran He. Beyond face rotation: Global and local perception GAN for photorealistic and identity preserving front view synthesis. In *IEEE International Conference on Computer Vision (ICCV)*, 2017). CR-GAN (Yu Tian, Xi Peng, Long Zhao, Shaoting Zhang, and Dimitris N. Metaxas. CR-GAN: learning complete representations for multi-view generation. *International Joint Conferences on Artificial Intelligence (IJCAI)*, 2018) also had dual paths, with the addition of self-supervision to refine weights learned by the supervised module. An example embodiment disclosed herein looks at various levels, including the addition of patch-level and enhanced global loss.

The proposed SuperFace is the first attempt to synthesize HR frontal faces from LR side-views. With this, face recognition and graphic-based tasks can overcome the common challenge of extreme poses of tiny faces (Yu Yin, Joseph P Robinson, Yulun Zhang, and Yun Fu. Joint super-resolution and alignment of tiny faces. *Conference on Artificial Intelligence (AAAI)*, 2020). Thus, this novel technology is directly employable in face-based applications. In addition, an example embodiment of a model disclosed herein has the practical advantage of accepting one or many input faces, and of arbitrary pose. As demonstrated in the experiments disclosed herein, each added face only improves the end result. Thus, an example embodiment provides state-of-the-art frontal face synthesis, first, with an example embodiment of a single image (SI) SRGAN that may be consistently improved with added profile faces.

Orthogonal Regularization

Orthogonal regularization forces the feature space to be more diverse. For this, some add a hard orthogonality constraint via singular value decomposition to remain on a Stiefel manifold (Yifan Sun, Liang Zheng, Weijian Deng, and Shengjin Wang. Svdnet for pedestrian retrieval. *In IEEE International Conference on Computer Vision (ICCV)*, pages 3800-3808, 2017). More recently, a softer variant was proposed, i.e., orthogonality regularization via Gram matrix per weight matrix to force a near identity matrix by the spectral (N. Bansal, X. Chen, and Z. Wang. Can We Gain More from Orthogonality Regularizations in Training Deep CNNs? *arXiv preprint arXiv:* 1810.09102, October 2018) or Frobenius (Di Xie, Jiang Xiong, and Shiliang Pu. All you need is beyond a good init: Exploring better solution for training extremely deep convolutional neural networks with orthonormality and modulation. In *IEEE Conference on Computer Vision and Pattern Recognition (CVPR)*, pages 6176, 6185, 2017) norm: the former claims superiority with consistent improvements for Convolutional Neural Networks (CNNs) with regularization, Spectral Restricted Isometry Property (SRIP). Having showed such improvements in feed-forward CNN trained for classification, an example embodiment extends SRIP to a GAN (i.e., SuperFace).

Methodology

As follows, the face-frontalization problem is defined from a single LR image. Then, an example embodiment of the model and three-level loss function of single-image (SI) SRGAN is described. Finally, multi-image (MI) SRGAN is introduced as an extension.

Problem Formulation

Let $\{I^{HF}, I^{LP}\}$ be a pair of HR frontal and LR side-view faces. Given a side-view face $I^{LP}$, the goal is to train a generator G to synthesize the corresponding HR frontal face image $\hat{I}^{LP} = G(I^{LP})$ with identity-preserved in $I^{HF}$.

A depiction of the general architecture of an example embodiment of SRGAN is shown in FIGS. 1A, 1C-1, and 1C-2 disclosed above. In the example embodiment of FIGS. 1C-1 and 1C-2, that apparatus 100, that is, G, includes a deep encoder, a side-view SR module, and a decoder. SR of side-view imagery is integrated into SRGAN to provide fine details of side-view faces, and hence help reconstruct higher frequency information (i.e., periocular, nose, and mouth regions) of frontal faces. In addition to the novel architecture, an example embodiment makes this SR and ill-posed problem well constrained by introducing a novel three-level loss (i.e., pixel-, patch-, and global-based losses) that learns a precise non-linear transformation between LR side-view and HR frontal-view faces.

Network Architecture

The generator G contains a deep encoder, while the decoder contains an SR module. Features $X \in \mathbb{R}^{C \times H \times W}$ extracted by the deep encoder are passed to the SR-branch for reconstruction. The SR side-view module feeds the decoder with higher frequency information to help reconstruct frontal faces.

Deep Encoder

Previous works in face rotation often employ U-Net-like models (Olaf Ronneberger, Philipp Fischer, and Thomas Brox. U-net: Convolutional networks for biomedical image segmentation. In *The Medical Image Computing and Computer Assisted Intervention Society*, 2015). It can be argued that the usual (e.g., conventional) encoder is too shallow to capture the high-frequency information needed to recover a high-quality, HR face from LR space. An example embodiment adopts a deeper encoder to recover edges and shapes of the HR frontal faces with higher precision. Another benefit is easing the task of SR of a side-view LR image, which provides details needed for reconstructing an HR frontal face. The encoder is shown in FIGS. 1C-1 and 1C-2, disclosed above: a 3×3 cony-layer followed by sixteen residual dense blocks (Yulun Zhang, Yapeng Tian, Yu Kong, Bineng Zhong, and Yun Fu. Residual dense network for image super-resolution. In *IEEE Conference on Computer Vision and Pattern Recognition (CVPR)*, pages 2472-2481, 2018).

SR-Integrated Decoder

From the output of the encoder, the two branches split, the side-view SR module to super-resolve side-view images and, ultimately, pass feed back into the main path, along with the decoder 102 of FIGS. 1A and 1C that reconstructs HR frontal faces. The features extracted from the side-view SR branch can be expressed as:

$$H = f_{sr}(X),$$

where $f_{sr}(\cdot)$ is the mapping of three convolutional layers in the side-view SR branch. Then, the side-view features H are down-sampled by two and four times to size 64×64 and 32×32, respectively. All side-view features H, $H_{64 \times 64}$, $H_{32 \times 32}$ are then fed back into the main path:

$$I_{SF} = g_3(g_1([g_1([g_0(X), H_{32 \times 32}]), H_{64 \times 64}]), H]),$$

where $[\cdot, \cdot]$ refers to the concatenation operation. $g_i(\cdot)(i \in \{0, 1, 2, 3\}$ merges features in the side-view SR branch and further transforms features in the main branch. From this, higher frequency content is fed to the main branch at various sizes to help reconstruct frontal faces.

To be constrained on the side-view SR branch, the features H are fed into a pixel shuffle layer (Wenzhe Shi, Jose Caballero, Ferenc Husz'ar, Johannes Totz, Andrew P. Aitken, Rob Bishop, Daniel Rueckert, and Zehan Wang. Real-time single image and video super-resolution using an efficient sub-pixel convolutional neural network. In *IEEE Conference on Computer Vision and Pattern Recognition (CVPR)*, 2016) to recover high-resolution side-view faces $I^{SP}$ of size 128×128.

Three-Level Loss

An example embodiment introduces a novel three-level (i.e., pixel-, patch-, and global-based) loss to learn a precise non-linear transformation between LR side-view and HR frontal-view faces.

Pixel-Level Loss

L1 loss is used as a pixel-level loss, since it provides better convergence than L2 in supervised image generation tasks. An example embodiment adopts pixel-wise L1 loss, shown as $I^{L1}$ 122' in FIG. 1C-1, disclosed above, to measure both super-resolved side-view faces $I^{SP}$ and synthesized frontal faces $I^{SF}$:

$$\mathcal{L}_{pix} = \frac{1}{W \times H} \sum_{w,h=1}^{W,H} |I_{w,h}^{HP} - I_{w,h}^{SP}| + |I_{w,h}^{HP} - I_{w,h}^{SP}|, \quad (1)$$

where W and H are the width and height of synthesized images (i.e., 128×128), respectively. $I^{HP}$ and $I^{HF}$ denote HR side-view and HR frontal faces, respectively.

Patch-Level Loss

Comparing to pixel-level loss, patch-level loss pays more attention to image structures (i.e., the edge and shape of facial components). An example embodiment may employ SSIM (Zhou Wang, Alan C Bovik, Hamid R Sheikh, Eero P Simon-celli, et al. Image quality assessment: from error visibility to structural similarity. *IEEE Transactions on Image Processing (TIP)*, 13(4):600-612, 2004) as patch-level loss to capture structural information and compliment pixel-level loss. SSIM measures the perceptual difference between a generated and a reference image and is shown as $I^{SSIM}$ 124' in FIG. 1C-1, disclosed above. Let $x = \{x_1, \ldots, x_{K^2}\}$ be the pixel values of two corresponding K×K patches cropped from the synthesized $I^{SF}$ and the HR frontal face $I^{HF}$, respectively. The SSIM of x and y is computed as:

$$SSIM(x, y) = 1 - \frac{(2\mu_x \mu_y + C_1)(2\sigma_{xy} + C_2)}{(\mu_x^2 \mu_y^2 + C_1)(\sigma_x^2 + \sigma_y^2 + C_2)}, \quad (2)$$

where $\mu_x$, $\mu_y$ and $\sigma_x$, $\sigma_y$ corresponds to the mean and standard deviation of x and y, respectively, and $\sigma_{xy}$ is the covariance of x and y. Constraints $C_1 = 0.01^2$ and $C_2 = 0.03^2$ are added for numeric stability.

Then, the patch-level loss $L_{patch}$ 122 of FIG. 1C-1, disclosed above, is defined over P patches as:

$$\mathcal{L}_{patch} = \frac{1}{P} \sum_{p=1}^{P} SSIM(x^p, y^p). \quad (3)$$

Global-Level Loss

According to an example embodiment, in the global-level loss there are adversarial and identity-preserving losses to synthesize photo-realistic frontal faces with high-frequency details and consistent identity as the input.

Adversarial Loss

The frontal-face generative models should pay attention to all details used to distinguish a face as a whole to synthesize photo-realistic, frontal faces. Inspired by (Peipei Li, Xiang Wu, Yibo Hu, Ran He, and Zhenan Sun. M2fpa: A multi-yaw multi-pitch high-quality database and benchmark for facial pose analysis. 2019), an example embodiment may employ two discriminators at training (i.e., one for frontal faces $D_f$ and another parsing-guided $D_p$). $D_f$ aims to distinguish real HR frontal faces $I^f$ from synthesized $\hat{I}^f$. The two discriminators $D_f$ and $D_p$ correspond to two adversarial losses, namely first adversarial losses $L_{adv}$ 127-1 and second adversarial losses $L_{adv}$ 127-2, respectively. Such losses are shown in FIG. 1C-1, disclosed above. Although $D_p$ aims to work with $D_f$, $D_f$ (i.e., $L_{adv}$ 127-1) focuses on the whole face, whereas $D_p$ (i.e., $L_{adv}$ 127-2) focuses on different facial regions, such as the masked facial regions 131*a*, 131*b*, and 131*c* of FIG. 1C-1. Specifically, a pre-trained face parsing model (Sifei Liu, Jimei Yang, Chang Huang, and Ming-Hsuan Yang. Multi-objective convolutional learning for face labeling. In *IEEE Conference on Computer Vision and*

*Pattern Recognition (CVPR)*, 2015) to generate image regions $I^P$ to capture low-frequency information (i.e., skin regions), key-points (i.e., eyes, brows, nose, and lips), and hairline is as follows:

$$\text{real } I^P = \{\hat{I}\odot M_s, \hat{I}\odot M_k, \hat{I}\odot M_h\},$$

$$\text{real } \hat{I}^P = \{\hat{I}\odot M_s, \hat{I}\odot M_k, \hat{I}\odot M_h\}, \quad (4)$$

where $M_s$, $M_k$, $M_h$ are skin 172, key-points 174, and hairline 176 masks shown in FIG. 1C-1, disclosed above, and $\odot$ is the element-wise product.

Then, the overall adversarial loss $L_{adv}$ of equation (5), below, is a combination of the first adversarial loss $L_{adv}$ 127-1 and second adversarial loss $L_{adv}$ 127-2 of FIG. 1C-1, disclosed above, and can be expressed as $$\mathcal{L}_{adv} = \sum_{j \in \{j,p\}} (E_{ij}[\log D_j(P)] + E_{ij}[\log(1 - D_j(\hat{P}))]). \quad (5)$$

Identity Preserving Loss

A useful aspect of evaluating face frontalization is the preservation of identities during the synthesis of frontal faces. An example embodiment exploits the ability of pre-trained face recognition networks to extract meaningful feature representations to improve the identity preserving ability of G. Specifically, a pre-trained 29-layer Light CNN, downloaded from https://github.com/AlfredXiangWu/LightCNN, (Xiang Wu, Ran He, Zhenan Sun, and Tieniu Tan. A light cnn for deep face representation with noisy labels. *IEEE Transactions on Information Forensics & Security*, 2018) was employed with its weights fixed during training to calculate an identity preserving loss for G. The identity preserving loss $L_{ID}$ 129 shown in FIG. 1C-1, disclosed above, is defined as the feature-level difference in the last two fully connected layers of Light CNN between the synthesized image $I^{SF}$, that is, the HR FV image 104 of FIG. 1C-1, disclosed above, and the ground-truth $I^{HF}$ (i.e., the ground-truth, frontal face image 128 of FIG. 1C-1, disclosed above):

$$\mathcal{L}_{ID} = \sum_{i=1}^{2} \|p_i(I^{SF}) - p_i(I^{HF})\|_2^2 \quad (6)$$

where $p_i$ ($i \in 1,2$) denotes the outputs of the two fully connected layers of LightCNN, and $\|\cdot\|_2$ denotes the L2-norm. Such feature-level differences are represented by a feature vector 133 in FIG. 1C-1, disclosed above.

Overall Loss

According to an example embodiment, the objective function for an example embodiment of the model is a weighted sum of aforementioned three-level losses:

$$\mathcal{L}_G = \lambda_1 \mathcal{L}_{pix} + \lambda_2 \mathcal{L}_{patch} + \lambda_3 \mathcal{L}_{adv} + \lambda_4 \mathcal{L}_{ID} + \lambda_5 \mathcal{L}_{tv} \quad (7)$$

where $\lambda_1$, $\lambda_2$, $\lambda_3$, $\lambda_4$, and $\lambda_5$ are hyper-parameters that control the trade-off of the loss terms. A total variation regularization $L_{tv}$ (Justin Johnson, Alexandre Alahi, and Li Fei-Fei. Perceptual losses for real-time style transfer and super-resolution. In *European Conference on Computer Vision (ECCV)*, 2016) is also included to remove unfavorable artifacts in synthesized frontal faces $I^{SF}$.

Multi-Image SRGAN

SI SRGAN synthesized a SR frontal face from one side-view image. Yet, there are often multiple images per subject in a real-life scenario (e.g., surveillance system). To leverage the complimentary information of different poses, an example embodiment referred to as MI SRGAN can penalize redundant latent representations and explore the maximum information of the LR images under arbitrary poses. An example embodiment of the framework of MI SRGAN is shown in FIGS. 1D-F. To be specific, MI SRGAN may use the same decoder as SI SRGAN, but multiple encoders with shared weights for different input images. Providing N LR side-view images of the same subject $I_i^{LP}$ ($i \in \{1, \ldots, N\}$), the super-resolved front face $I^{SF}$ 104 of FIGS. 1C-1 and 1C-2, disclosed above, can be obtained by:

$$I^{SF} = f_{dec}([e(I_0^{LP}), \ldots, o(I_n^{LP})]), \quad (8)$$

where $o(\cdot)$ denotes the operation of the deep encoder, and $f_{dec}(\cdot)$ denotes the operation of SR-integrated decoder. $[e(I_0^{LP}), \ldots, e(I_n^{LP})]$ refers to the concatenation of features extracted from each image.

Different from image-level and feature-level fusion, an example embodiment of MI SRGAN introduces a constraint (i.e., orthogonal regularization) on the features extracted from the encoder. The orthogonal constraint makes the features more diverse and hence complement each other as much as possible. According to an example embodiment, the objective function of SI SRGAN is augmented with the loss:

$$\mathcal{L}_{orth} = \frac{1}{N}\sum_{n=1}^{N}\left\|e(I_n^{LP})^T e(I_n^{LP})\right\|_F^2, \quad (9)$$

where N is the number of LR input images. $\|\cdot\|_F^2$ denotes the squared Frobenius norm and $L_{orth}$ 162 is shown in FIG. 1F. Then the loss function for MI SRGAN can be expressed as:

$$\mathcal{L}_{MI} = \mathcal{L}_G + \mathcal{L}_{orth}. \quad (10)$$

As disclosed herein, an example embodiment of a super-resolution integrated generative adversarial network (SR-GAN) can synthesize photo-realistic, identity-preserving frontal faces from LR-to-HR. As understood, an example embodiment is first to address the problem of rotating tiny profile faces. An example embodiment of an SR side-view module enhances faces to provide the high-frequency details needed to produce photo-realistic, identity-preserving faces. In addition, a novel three-level loss captures information on the pixel, patch, and global-levels. With the two modules fused, a precise non-linear mapping between LR side-view and HR frontal-view is learned. Furthermore, an example embodiment of a model disclosed herein handles single and multi-image inputs—more samples with arbitrary poses per subject as input, the better the quality of the synthesized output. According to an example embodiment, a constraint may be imposed on multi-image inputs to remove redundant information (i.e., orthogonal regularization).

FIG. 2 is a flow diagram (200) of an example embodiment of a computer-implemented method for frontal face synthesis. The method begins (202) and synthesizes a high-resolution (HR) frontal-view (FV) image of a face from received features of a low-resolution (LR) non-frontal-view (NFV) image of the face, the received features input to a main path and an auxiliary path split from the main path, the HR FV image being of a higher resolution relative to a lower resolution of the LR NFV image (204). To synthesize the HR FV image, the method produces, in the auxiliary path, auxiliary-path features from the received features (206) and feeds the auxiliary-path features produced from the auxiliary path into the main path for synthesizing the HR FV image, the auxiliary-path features representing a HR NFV image of the face at the higher resolution (208). The method thereafter ends (210) in the example embodiment.

FIG. 3 is a block diagram of an example of the internal structure of a computer 300 in which various embodiments of the present disclosure may be implemented. The computer 300 contains a system bus 342, where a bus is a set of hardware lines used for data transfer among the components of a computer or processing system. The system bus 342 is essentially a shared conduit that connects different elements of a computer system (e.g., processor, disk storage, memory, input/output ports, network ports, etc.) that enables the transfer of information between the elements. Coupled to the system bus 342 is an I/O device interface 344 for connecting various input and output devices (e.g., keyboard, mouse, displays, printers, speakers, etc.) to the computer 300. A network interface 346 allows the computer 300 to connect to various other devices attached to a network. Memory 348 provides volatile or non-volatile storage for computer software instructions 352 and data 354 that may be used to implement embodiments of the present disclosure, where the volatile and non-volatile memories are examples of non-transitory media. Disk storage 356 provides non-volatile storage for computer software instructions 352 and data 354 that may be used to implement embodiments of the present disclosure. A central processor unit 358 is also coupled to the system bus 342 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams, such as disclosed in FIGS. 1A-F and FIG. 2, may be implemented in software or hardware, such as via one or more arrangements of circuitry of FIG. 3, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An apparatus for frontal face synthesis, the apparatus comprising:
   a decoder configured to synthesize a high-resolution (HR) frontal-view (FV) image of a face from received features of a low-resolution (LR) non-frontal-view (NFV) image of the face, the HR FV image being of a higher resolution relative to a lower resolution of the LR NFV image, the decoder including a main path and an auxiliary path, the auxiliary path configured to produce auxiliary-path features from the received features and feed the auxiliary-path features produced into the main path for synthesizing the HR FV image, the auxiliary-path features representing a HR NFV image of the face at the higher resolution.

2. The apparatus of claim 1, wherein the main path includes multiple successive main path convolutional stages of respective successive convolutional layers, the multiple successive main path convolutional stages configured to increase resolution of the received features of the LR NFV image successively, the multiple successive main path convolutional stages including weights trained based on back-propagated pixel-level, local-level, and global-level losses, the back-propagated pixel-level, local-level, and global-level losses determined based on differences between a given HR FV image and a ground-truth, frontal face image, the given HR FV image synthesized by the apparatus in a training phase of the apparatus, the pixel-level and local-level losses representing differences between corresponding pixels and corresponding patches, respectively, of the given HR FV and ground-truth, frontal face images, the global-level losses including adversarial and identity-preserving losses.

3. The apparatus of claim 1, wherein the main path includes:
   multiple successive main path convolutional stages of respective successive convolutional layers, the multiple successive main path convolutional stages configured to increase resolution of the received features of the LR NFV image successively;
   multiple concatenators configured to concatenate (i) respective features output from a respective main path convolutional stage of the multiple successive main path convolutional stages, the respective features output at a respective resolution, and (ii) the auxiliary-path features produced and fed from the auxiliary path at the respective resolution; and
   a main path output convolutional layer configured to transform concatenated features into the HR FV image, the concatenated features output at the higher resolution by a given concatenator of the multiple concatenators, the concatenated features transformed based on a non-linear transformation, the non-linear transformation learned in a training phase of the apparatus.

4. The apparatus of claim 3, wherein the auxiliary path includes:
   an auxiliary convolutional neural network (CNN) with layers configured to up-sample the received features to produce up-sampled features and to extract features from the up-sampled features to produce the auxiliary-path features; and
   wherein the decoder further includes a respective down-sampler configured to down-sample the auxiliary-path features produced in an event the respective features output from the respective main path convolutional stage have a respective resolution that does not match the higher resolution.

5. The apparatus of claim 4, wherein the auxiliary path included a convolutional layer and wherein, in a training phase of the apparatus, the convolutional layer is configured to reconstruct the HR NFV image from the auxiliary-path features produced, and wherein weights of the auxiliary CNN are trained, in the training phase, based on back-propagated losses, the back-propagated losses determined, in the training phase, based on differences between the HR NFV image reconstructed and a ground-truth, HR NFV image at the higher resolution.

6. The apparatus of claim 1, wherein the LR NFV image is a single LR SV image and wherein the apparatus further comprises an encoder, the encoder including:
a combination of a plurality of convolutional layers configured to produce a feature map of features extracted from the LR SV image; and
a pixel-wise sum operator configured to generate the received features by performing a pixel-wise sum of the LR SV image and the feature map produced and pass the received features to the main path and auxiliary path via an output of the encoder, the main path and auxiliary path split at the output.

7. The apparatus of claim 6, further comprising:
a plurality of encoders, each encoder of the plurality of encoders including a respective CNN with a shared set of weights, the respective CNN configured to extract respective features from a respective LR NFV image of a plurality of LR NFV images, the shared set of weights trained, in a training phase of the apparatus, based on orthogonal losses to diversify the respective features extracted; and
a concatenator configured to produce the received features by concatenating the respective features extracted by the plurality of encoders and to pass the received features to the main and auxiliary paths of the decoder.

8. The apparatus of claim 7, wherein quality of the HR FV image synthesized is improved by the respective features extracted from each LR NFV image of the plurality of LR NFV images, the quality related to sharpness or clarity of at least one detail of the face in the HR FV image synthesized.

9. The apparatus of claim 1, wherein the auxiliary-path features produced and fed by the auxiliary path into the main path increase high-frequency information of the face in the HR FV image, the high-frequency information related to a periocular, nose, or mouth region of the face, or combination thereof.

10. The apparatus of claim 1, wherein the main path is based on a generative adversarial network (GAN) and wherein the auxiliary path enables super-resolution (SR) to be integrated with the GAN to produce a super-resolution integrated generative adversarial network (SRGAN).

11. A computer-implemented method for frontal face synthesis, the method comprising:
synthesizing a high-resolution (HR) frontal-view (FV) image of a face from received features of a low-resolution (LR) non-frontal-view (NFV) image of the face, the received features input to a main path and an auxiliary path split from the main path, the HR FV image being of a higher resolution relative to a lower resolution of the LR NFV image,
the synthesizing including producing, in the auxiliary path, auxiliary-path features from the received features and feeding the auxiliary-path features produced from the auxiliary path into the main path for synthesizing the HR FV image, the auxiliary-path features representing a HR NFV image of the face at the higher resolution.

12. The computer-implemented method of claim 11, wherein the main path includes multiple successive main path convolutional stages of respective successive convolutional layers and wherein the method further comprises:
training weights of the multiple successive main path convolutional stages in a training phase based on back-propagated pixel-level, local-level, and global-level losses, the back-propagated pixel-level, local-level, and global-level losses determined based on differences between a given HR FV image and a ground-truth, frontal face image, the given HR FV image synthesized in a training phase, the pixel-level and local-level losses representing differences between corresponding pixels and corresponding patches, respectively, of the given HR FV and ground-truth, frontal face images, the global-level losses including adversarial and identity-preserving losses; and
increasing resolution of the received features of the LR NFV image successively via the multiple successive main path convolutional stages.

13. The computer-implemented method of claim 11, wherein the main path includes multiple successive main path convolutional stages of respective successive convolutional layers and wherein the method further comprises:
increasing resolution of the received features of the LR NFV image successively via the multiple successive main path convolutional stages;
concatenating, at a respective concatenator of multiple concatenators, (i) respective features output from a respective main path convolutional stage of the multiple successive main path convolutional stages, the respective features output at a respective resolution, and (ii) the auxiliary-path features produced and fed from the auxiliary path at the respective resolution; and
transforming, at a main path output convolutional layer of the main path, concatenated features into the HR FV image, the concatenated features output at the higher resolution by a given concatenator of the multiple concatenators, the concatenated features transformed based on a non-linear transformation, the non-linear transformation learned in a training phase.

14. The computer-implemented method of claim 13, wherein the auxiliary path includes an auxiliary convolutional neural network (CNN) and a convolutional layer and wherein the method further comprises:
at the auxiliary convolutional neural network (CNN), producing up-sampled features by up-sampling the received features;
producing the auxiliary-path features by extracting features from the up-sampled features; and
down-sampling the auxiliary-path features produced in an event the respective features output from the respective main path convolutional stage have a respective resolution that does not match the higher resolution.

15. The computer-implemented method of claim 14, further comprising:
in a training phase, at a convolution layer, reconstructing the HR NFV image from the auxiliary path features produced; and
training, in the training phase, weights of the auxiliary CNN based on back-propagated losses, the back-propagated losses determined, in the training phase, based on differences between the HR NFV image reconstructed and a ground-truth, HR NFV image at the higher resolution.

16. The computer-implemented method of claim 11, wherein the LR NFV image is a single LR SV image and wherein the method further comprises:
employing a combination of a plurality of convolutional layers to produce a feature map of features extracted from the LR SV image;
generating the received features by performing a pixel-wise sum of the LR SV image and the feature map produced; and
passing the received features generated to the main path and auxiliary path.

17. The computer-implemented method of claim 16, further comprising:
at a plurality of encoders, each encoder of the plurality of encoders including a respective CNN with a shared set of weights, extracting, at the respective CNN, respective features from a respective LR NFV image of a plurality of LR NFV images, the shared set of weights trained, in a training phase, based on orthogonal losses to diversify the respective features extracted;
producing the received features by concatenating the respective features extracted; and
passing the received features to the main and auxiliary paths.

18. The computer-implemented method of claim 17, further comprising improving quality of the HR FV image synthesized, the quality improved by the respective features extracted from each LR NFV image of the plurality of LR NFV images, the quality related to sharpness or clarity of at least one detail of the face in the HR FV image synthesized.

19. The computer-implemented method of claim 18, further comprising increasing high-frequency information of the face in the HR FV image via the auxiliary features produced and fed by the auxiliary path into the main path, the high-frequency information related to a periocular, nose, or mouth region of the face, or combination thereof.

20. A non-transitory computer-readable medium for frontal face synthesis, the non-transitory computer-readable medium having encoded thereon a sequence of instructions which, when loaded and executed by a processor, causes the processor to:
synthesize a high-resolution (HR) frontal-view (FV) image of a face from received features of a low-resolution (LR) non-frontal-view (NFV) image of the face, the received features input to a main path and an auxiliary path split from the main path, the HR FV image being of a higher resolution relative to a lower resolution of the LR NFV image,
the sequence of instructions further configured to cause the processor to produce, in the auxiliary path, auxiliary-path features from the received features and feed the auxiliary-path features produced from the auxiliary path into the main path for synthesizing the HR FV image, the auxiliary-path features representing a HR NFV image of the face at the higher resolution.

* * * * *